US010672107B2

(12) United States Patent
Tsutsumi

(10) Patent No.: US 10,672,107 B2
(45) Date of Patent: Jun. 2, 2020

(54) IMAGE PROCESSING APPARATUS AND METHOD OF CONTROLLING THE SAME

(71) Applicant: CANON KABUSHIKI KAISHA, Tokyo (JP)

(72) Inventor: Takayuki Tsutsumi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 140 days.

(21) Appl. No.: 15/919,397

(22) Filed: Mar. 13, 2018

(65) Prior Publication Data

US 2018/0268524 A1    Sep. 20, 2018

(30) Foreign Application Priority Data

Mar. 16, 2017  (JP) .................................. 2017-051710

(51) Int. Cl.
*G06T 3/40*  (2006.01)
*G06T 5/40*  (2006.01)
*G06T 5/20*  (2006.01)

(52) U.S. Cl.
CPC .............. *G06T 3/4069* (2013.01); *G06T 5/20* (2013.01); *G06T 5/40* (2013.01); *G06T 2207/20021* (2013.01)

(58) Field of Classification Search
CPC ......... G06T 2207/20021; G06T 3/4069; G06T 5/20; G06T 5/40
See application file for complete search history.

(56) References Cited

U.S. PATENT DOCUMENTS

2015/0317772 A1* 11/2015 Lim .......................... G06T 5/20
382/167

FOREIGN PATENT DOCUMENTS

| CN | 1193399 A | 9/1998 |
| CN | 104052963 A | 9/2014 |
| JP | 2002057888 A | 2/2002 |
| JP | 3919430 B2 | 5/2007 |

OTHER PUBLICATIONS

Office Action Issued in Chinese Appln. No. 201810217500.9 dated Sep. 27, 2019. English translation provided.

* cited by examiner

*Primary Examiner* — Nirav G Patel
(74) *Attorney, Agent, or Firm* — Rossi, Kimms & McDowell LLP

(57) ABSTRACT

In order to suitably perform image processing on each partial area of an input image, an image processing apparatus divides an input image into a plurality of rectangular images, and performs image processing for each rectangular image. The apparatus stores intermediate information corresponding to each pixel in a rectangular image; performs image processing on pixel data of a rectangular image of interest based on the intermediate information, and generates intermediate information to be used in image processing on pixel data subsequent to the rectangular image of interest; and updates the intermediate information with the generated intermediate information. The apparatus updates the intermediate information based on given update period information that indicates an intermediate information update period.

15 Claims, 17 Drawing Sheets

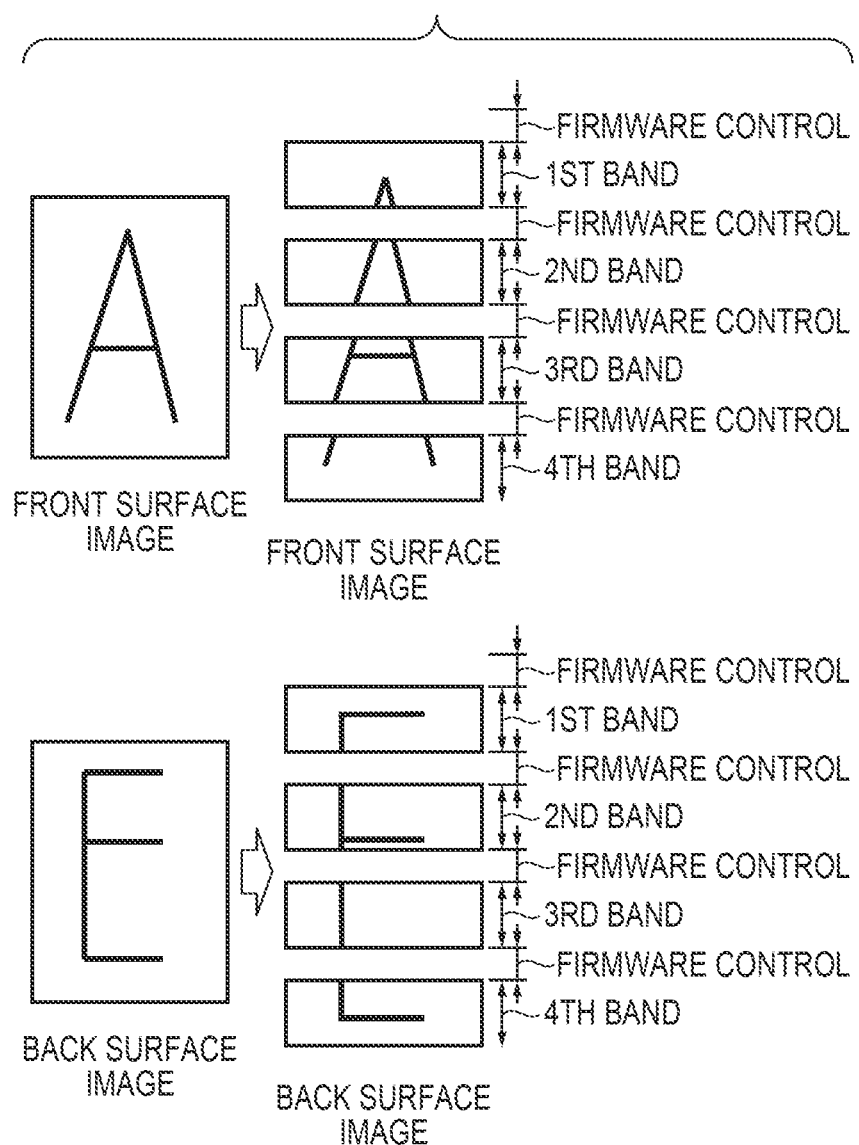
F I G. 6A

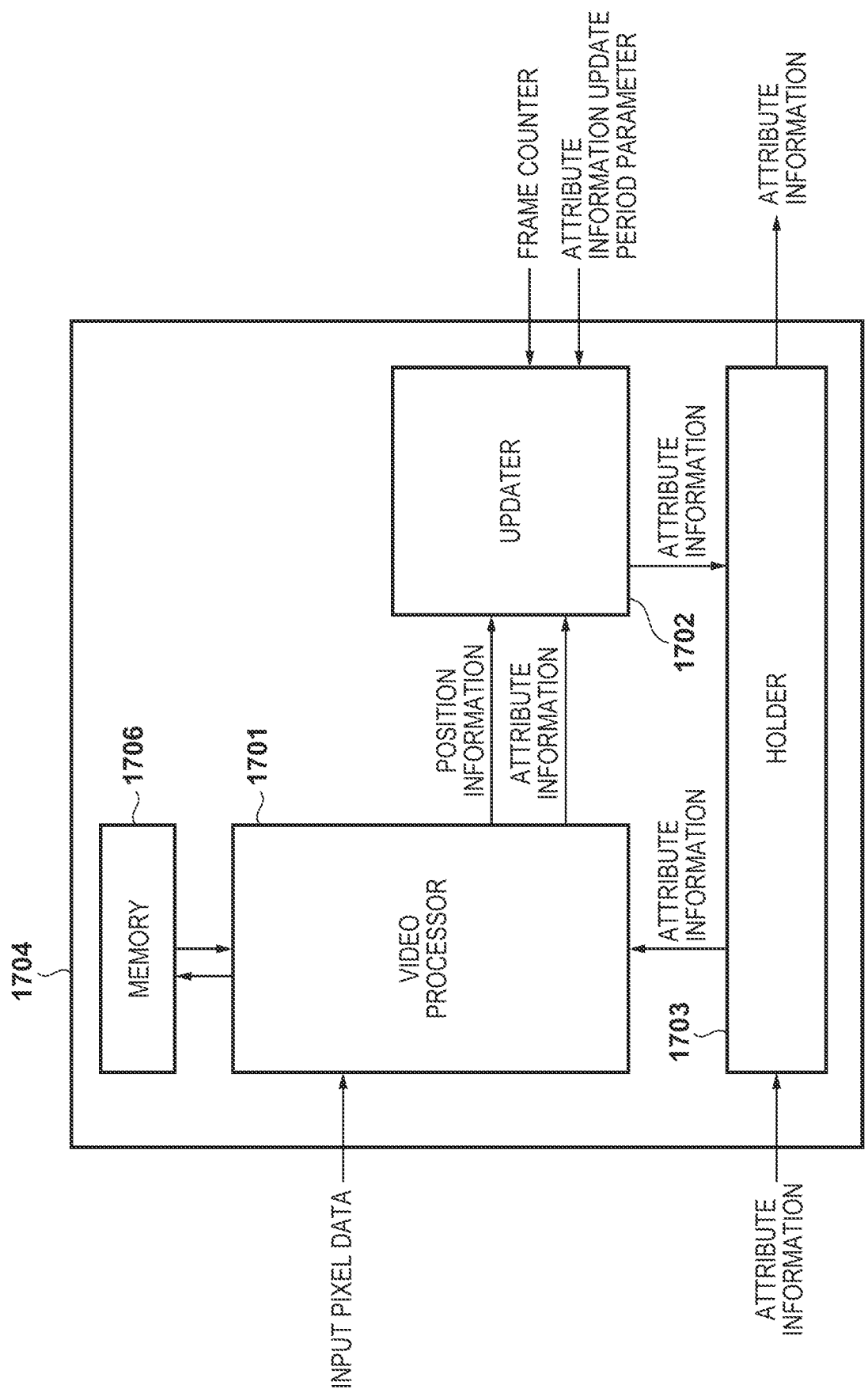

IMAGE PROCESSING APPARATUS AND METHOD OF CONTROLLING THE SAME

BACKGROUND OF THE INVENTION

Field of the Invention

The present invention relates to a technique of processing by dividing an image.

Description of the Related Art

In general, when performing image processing, an image of one page is divided into strip-shaped areas in a sub-scanning direction at the time of input (or at the time of output), and image processing is performed on each area. In a case where images exist for a plurality of pages, this processing is performed in proportion to the plurality of pages. Hereinafter, such a divided strip-shaped image area is referred to as a band area, and image processing corresponding to a band area is called band processing. In the foregoing image processing, in the case of software control (parameter setting), normally, execution is in units for which it is possible to detect an interrupt from hardware (HW). That is, it is typical to execute control for every page of an image and before/after each band process.

In image processing in the above mentioned software control, in a case of performing image processing for every band area, it is necessary to transfer information between band areas so that a degradation of image quality accompanying an image mismatch at a boundary of band areas for which image processing was performed, for example, does not occur. For example, in scaling processing there is generated a phase that represents a distance between an input pixel position and an output pixel position depending on a scaling ratio. Hereinafter, information indicating this phase is called phase information, and information indicating the phase that has been set at the time of the start of band processing is called initial phase information. To maintain good image quality, it is necessary to transfer phase information between band processes. Specifically, it is necessary to transfer, as initial phase information for a subsequent band, phase information at the time of completion of a preceding band process.

As the method of transfer, a method that calculates the initial phase information necessary for each band process in firmware control (CPU processing) in advance, and sets the initial phase information for each band processing is typical. However, in recent years, due to processing acceleration and an increase in resolution of images, it has become more difficult to handle this by firmware control between band processes. Accordingly, in Japanese Patent Laid-Open No. 2002-57888 (PTL1), a method in which phase information is automatically updated in accordance with a scaling ratio, and scaling processing is performed has been proposed. Since phase information is automatically updated, it is not necessary to set initial phase information for the subsequent band process.

However, the method of PTL1 can be applied in a case where divided band areas are continuous, but it cannot be applied in cases where the divided band areas are discontinuous. Accordingly, it cannot be applied in a use case in which front surface and back surface image band areas whose scaling ratios are the same are processed alternatingly (hereinafter, called double-sided processing). Specifically, in the case of a use case in which phase information is not continuous, there are cases in which automatically updated phase information cannot be used as initial phase information of a subsequent band process. In particular, in a case where the scaling ratios of the front surface and the back surface are the same, it is necessary that the respective initial phase information of the front surface and the back surface be the same. Also, application to a use case in which band processing on an image configured by a plurality of colors is divided over a plurality of times for each color (hereinafter called multicolor processing) is impossible. Additionally, in a case where phase information is set by firmware control, there is the possibility that the required performance will not be achieved. Also, while it will be possible to apply the foregoing technique if the same number of HW resources as the number of planes/the number of colors are prepared, there is a problem in that the circuit scale will increase.

SUMMARY OF THE INVENTION

According to one aspect of the present invention, an image processing apparatus operable to divide an input image into a plurality of rectangular images, and to perform image processing for each rectangular image, the apparatus comprises: a storage unit configured to store intermediate information corresponding to each pixel in a rectangular image; an image processing unit configured to perform image processing on pixel data of a rectangular image of interest based on the intermediate information stored in the storage unit, and to generate intermediate information to be used in image processing on pixel data subsequent to the rectangular image of interest; and an updating unit configured to update the intermediate information stored in the storage unit with the intermediate information generated by the image processing unit, wherein the updating unit updates the intermediate information based on given update period information that indicates an intermediate information update period.

The present invention can more suitably execute image processing for processing each partial area in relation to an input image.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6A and FIG. 6B are views for describing an order of processing in double-sided band processing and firmware control positioning.

FIG. 17 is a detailed block diagram of an image processor (Fourth Embodiment).

DESCRIPTION OF THE EMBODIMENTS

Explanation is given in detail below, with reference to the drawings, of suitable embodiments of the invention. Note, the following embodiments are only examples and are not intended to limit the scope of present invention.

First Embodiment

A first embodiment of an image processing apparatus according to the present invention is described below using an example of an image processing apparatus that divides an input image, and then performs processing on each divided area.

<Apparatus Configuration>

Figure 15:
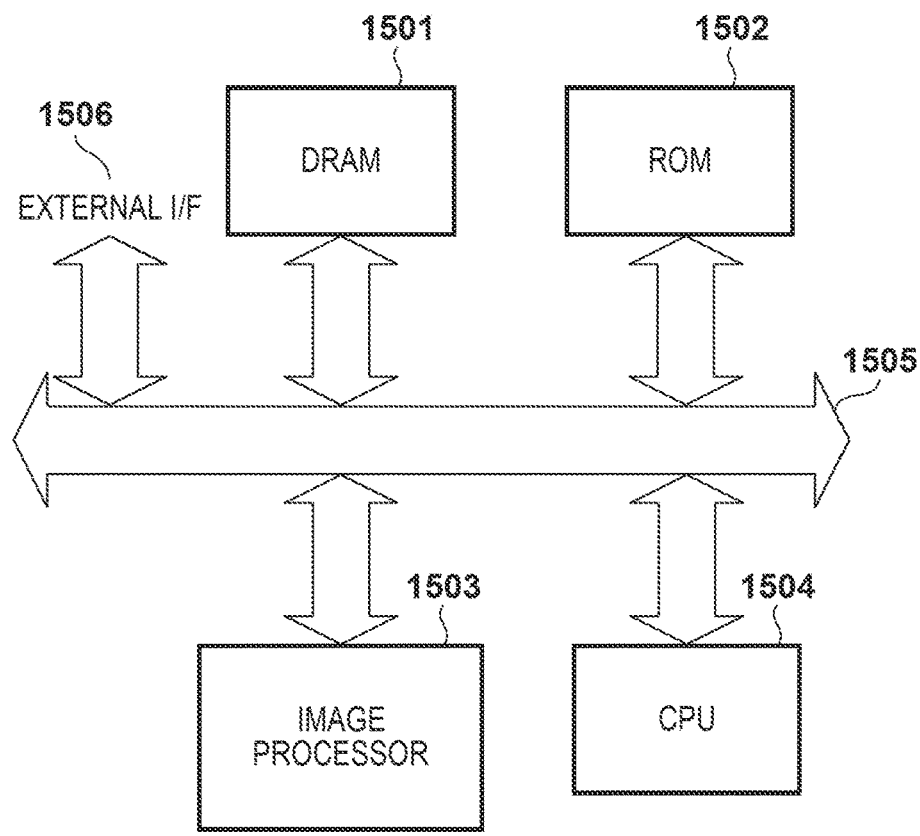
FIG. 15 is a block diagram indicating an overall configuration of an image processing apparatus according to the first embodiment.

FIG. 15 is a block diagram indicating an overall configuration of an image processing apparatus according to the first embodiment. An image processing apparatus includes a DRAM 1501, a ROM 1502, an image processor 1503, and a CPU 1504 which are connected to each other via a system bus 1502. Also, the system bus 1502 is configured to be able to connect with an external apparatus (not shown) via an external I/F 1506.

Note that, in the DRAM 1501, images inputted from the external I/F 1506 which is connected to a scanner or the like are being stored. The CPU 1504 instructs firmware control of the image processor 1503. Also, after confirming that an image of a rectangle unit (a rectangular image) is stored in the DRAM 1501, the start of execution of image processing is notified to the image processor 1503. Below, a rectangle unit is assumed to be a band unit, and image processing in such band units is called band processing. Also, image processing is described using scaling processing as an example.

Figure 3:
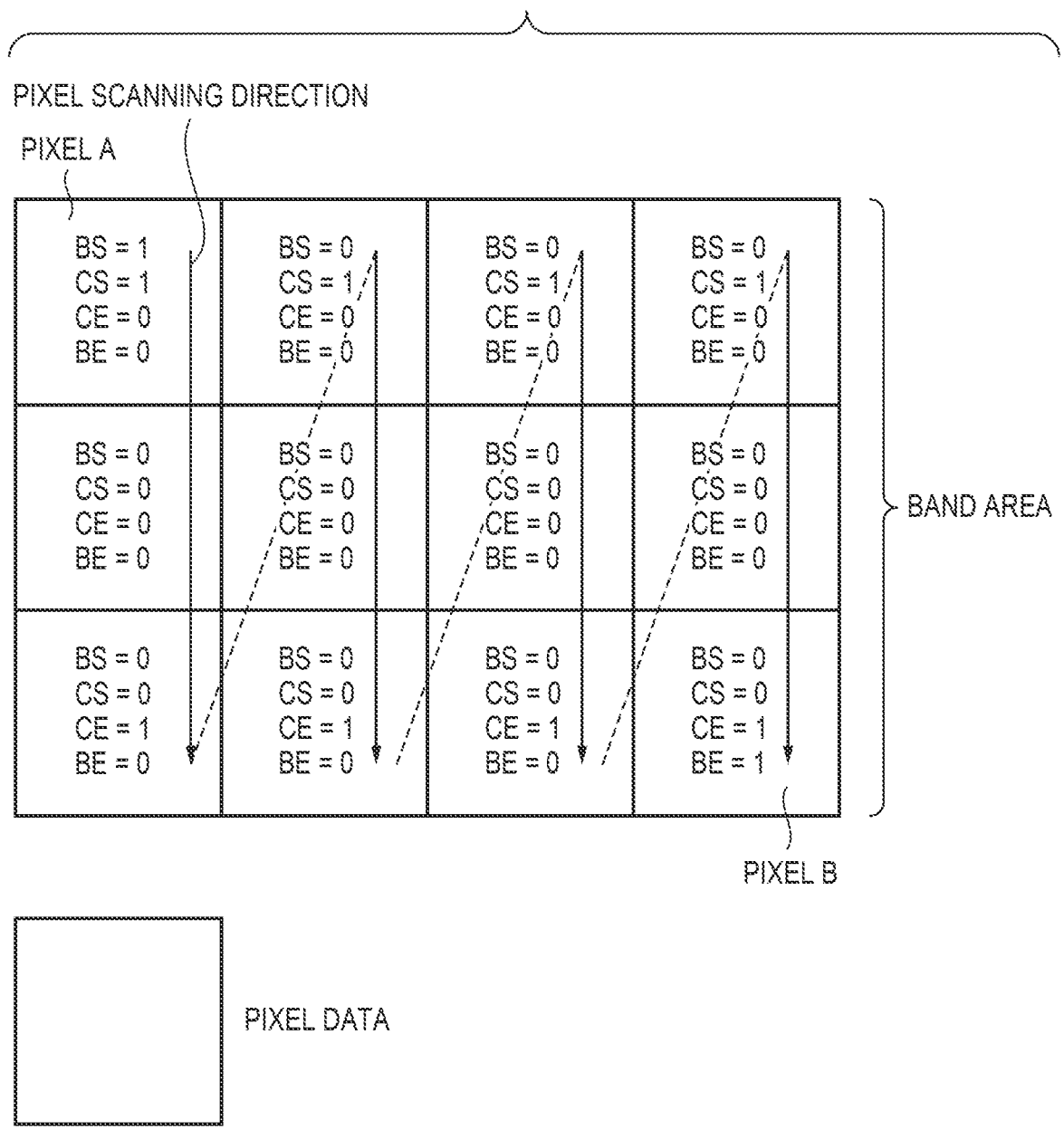
FIG. 3 is a view for describing band processing and position information.

FIG. 3 is a view for describing band processing and position information. A rectangular cell represents a pixel position, and a band area of 4×3 pixels is exemplified.

Band processing is performed in a "pixel scanning direction (direction of the arrows)" from pixel A to pixel B. The position information here is expressed in a total of 4 bits: BS (band start), CS (column start), CE (column end), and BE (band end), for example. BS represents a band area start position, and BE represents a band area end position. Also, CS and CE indicate a start position and an end position in a band area column direction (vertical direction), that is a top edge and a bottom edge of a band area. The pixel position of pixel A is expressed by BS=1, CS=1, CE=0, and BE=0, and indicates a pixel when starting band processing. The pixel position of pixel B is expressed by BS=0, CS=0, CE=1, and BE=1, and indicates a pixel when ending band processing. That is, band processing is started at BS and ended at BE.

Figure 1:
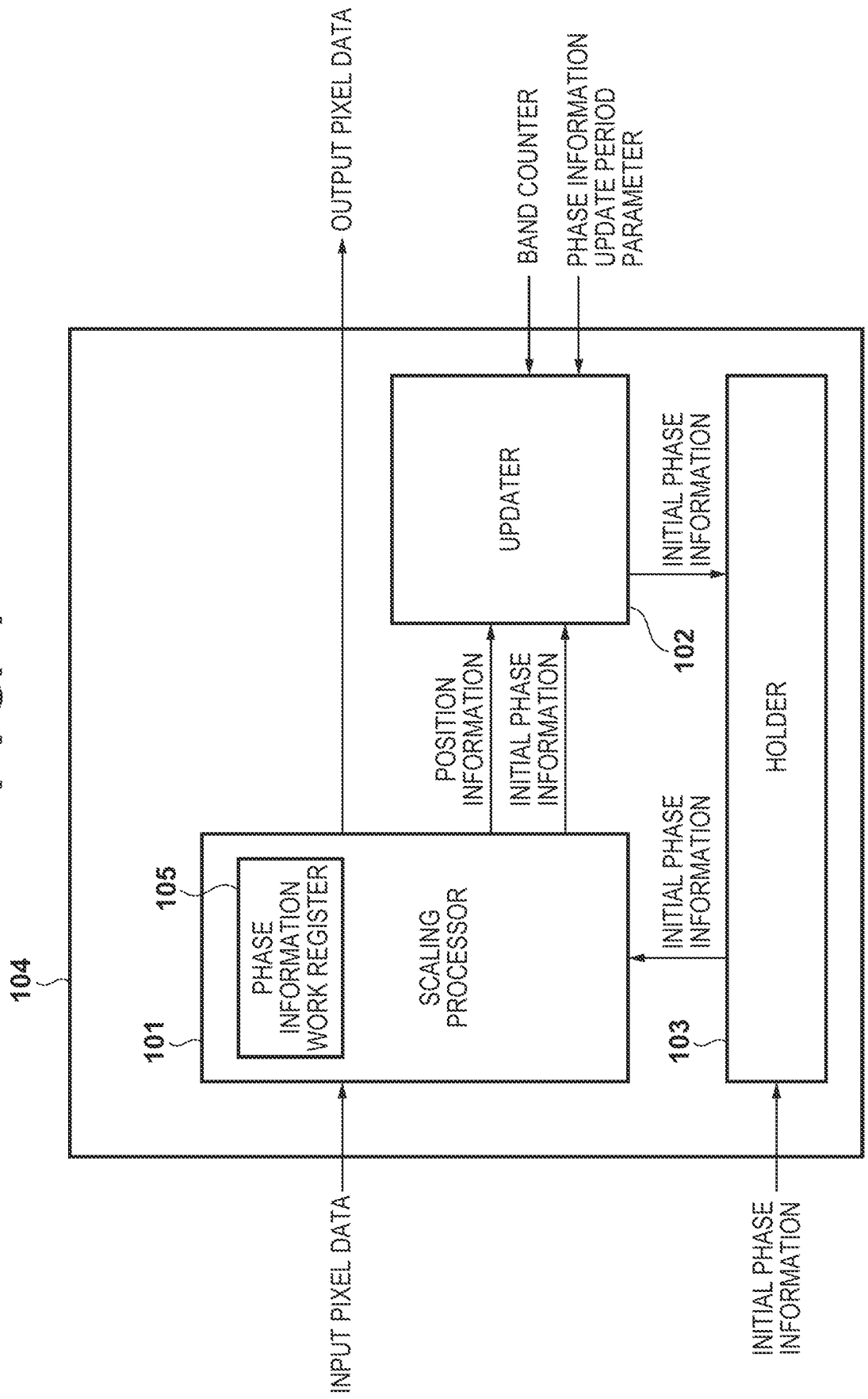
FIG. 1 is a detailed block diagram of an image processor.

FIG. 1 is a detailed block diagram of an image processor 104. The image processor 104 is configured by a later-described scaling processor 101, updater 102, and holder 103, and corresponds to the image processor 1503.

The scaling processor 101 is a functional unit for inputting band images that are stored in the DRAM 1501 in pixel units. Below, the pixel unit data is called pixel data. Also, based on initial phase information stored in the holder 103, which is described later, scaling is performed by a publicly known method using a bi-linear method or a bi-cubic method, for example, and output pixel data is produced. Also, position information corresponding to the output pixel data is outputted. Also, when band processing (a rectangular image of interest) ends, initial phase information of a subsequent band process is outputted. This initial phase information is an initial value of phase information set at the time of a column direction start (including when band processing starts). This phase information is a distance between an input pixel position and an output pixel position.

Figure 16:
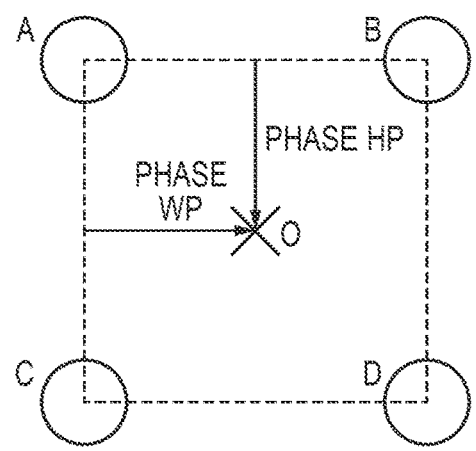
FIG. 16 is a view for describing phase information.

FIG. 16 is a view for describing phase information. As illustrated in FIG. 16, in a case where the phase information in the vertical direction is phase HP and the phase information in the horizontal direction is phase WP, in relation to the input pixel positions A, B, C, D (surface ABDC), the output pixel position ends up being the position of "O". Note that phase information is present in the vertical direction and the horizontal direction as described above, and hereinafter to facilitate understanding, the foregoing phase information will be described only for the position information in the vertical direction.

The updater 102 is a functional unit that inputs position information and initial phase information generated by the scaling processor 101. Also, in accordance with the later-described band counter and phase information update period parameter, the initial phase information is updated. Detailed operation of the updater 102 will be described later.

The holder 103 is a register for holding input/output intermediate information (initial phase information here) of the scaling processor 101. The intermediate information (initial intermediate information) is updated in the updater 102 and in firmware control. Note that the initial phase information is stored in the holder 103 prior to image processing on the first band image of a plurality of band images.

<Apparatus Operation>

Figure 2:
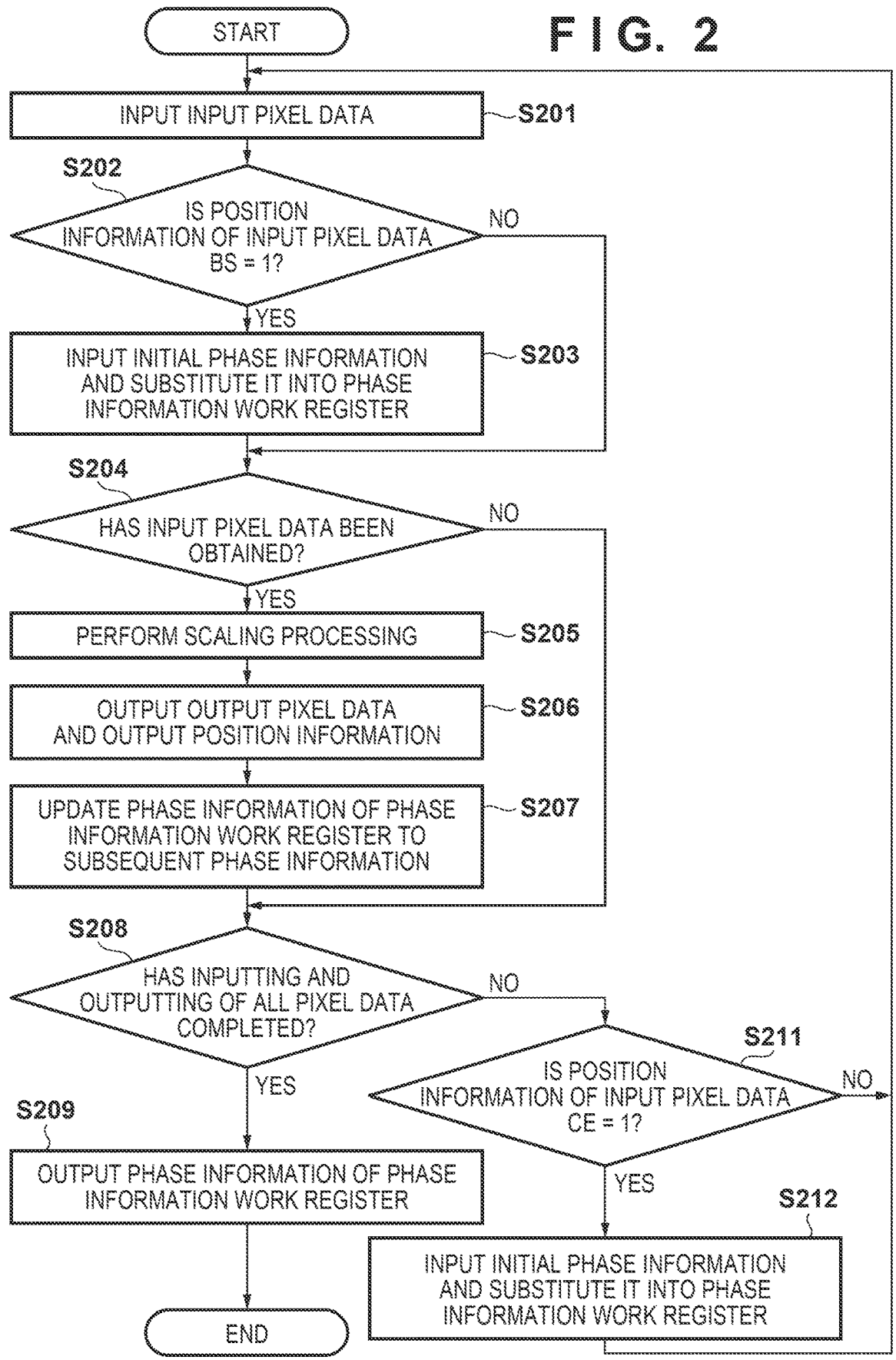
FIG. 2 is a flowchart illustrating operation of a scaling processor.

FIG. 2 is a flowchart illustrating operation of the scaling processor 101. Note that in the scaling processor 101, though not shown graphically, prior to band processing, information of a band area to be processed and information of a scaling ratio are set, and it is assumed that by using these, it is possible to grasp position information of input/output pixel data. Note that in a case where position information cannot be grasped, it is necessary to generate the position information by a CPU, and to input it in synchronism with the timing of inputting the pixel data.

In step S201, the scaling processor 101 inputs input pixel data from the DRAM 1501. The input pixel data is held in an internal SRAM which is not shown graphically, and is used in later-described scaling processing.

In step S202, the scaling processor 101 determines whether or not the input pixel data represents a timing of starting band processing (BS=1). In a case where BS=1, step S203 is advanced to, and in a case where BS=0, step S204 is advanced to.

In step S203, the scaling processor 101 inputs initial phase information which is being stored in the holder 103, and stores it in a work register 105. The phase information that is being stored in the work register 105 is used to calculate the pixel position of the output pixel data. Also, when outputting output pixel data, it is updated to calculate a subsequent output pixel position.

In step S204, the scaling processor 101 determines whether or not sufficient input pixel data for generating output pixel data has been obtained. In the case where sufficient input pixel data has been obtained, step S205 is advanced to, and in the case where it has not yet been obtained, step S208 is advanced to.

At the stage at which sufficient input pixel data for generating output pixel data has been obtained, the scaling processor 101 performs scaling processing (step S205), and outputs the output pixel data and the output position information corresponding thereto (step S206). Also, for the subsequent output, the phase information stored in the work register is updated to phase information for the subsequent output pixel data (step S207). In other words, phase information used in subsequent processing is generated based on the image processing result. The method of generating the phase information may be any method. For example, it is possible to generate the subsequent phase information from the phase information of the previous time and the distance from the output pixel.

In step S208, the scaling processor 101 determines whether the inputting of all of the input pixel data and the outputting of the output pixel data has completed. In the case where it has completed, step S209 is advanced to, and in the case where it has not yet been completed, step S211 is advanced to.

In step S209, the scaling processor 101 outputs the phase information of the work register as initial phase information for the subsequent band process. However, there is the possibility that the initial phase information will be rewritten to initial phase information for that band process in the updater 102 as described later.

In step S211, the scaling processor 101 determines whether or not the position information of the input pixel data is an end position (CE=1) of a column edge portion. In the case where CE=1, similarly to step S203, the initial phase information being stored in the holder 103 as is described later is inputted, and substituted into the work register 105 (step S212). In other words, the phase information is set to the initial phase information of the start position (CS=1) of the subsequent column edge portion. Then step S201 is returned to, and the subsequent input pixel data is inputted.

Figure 4:
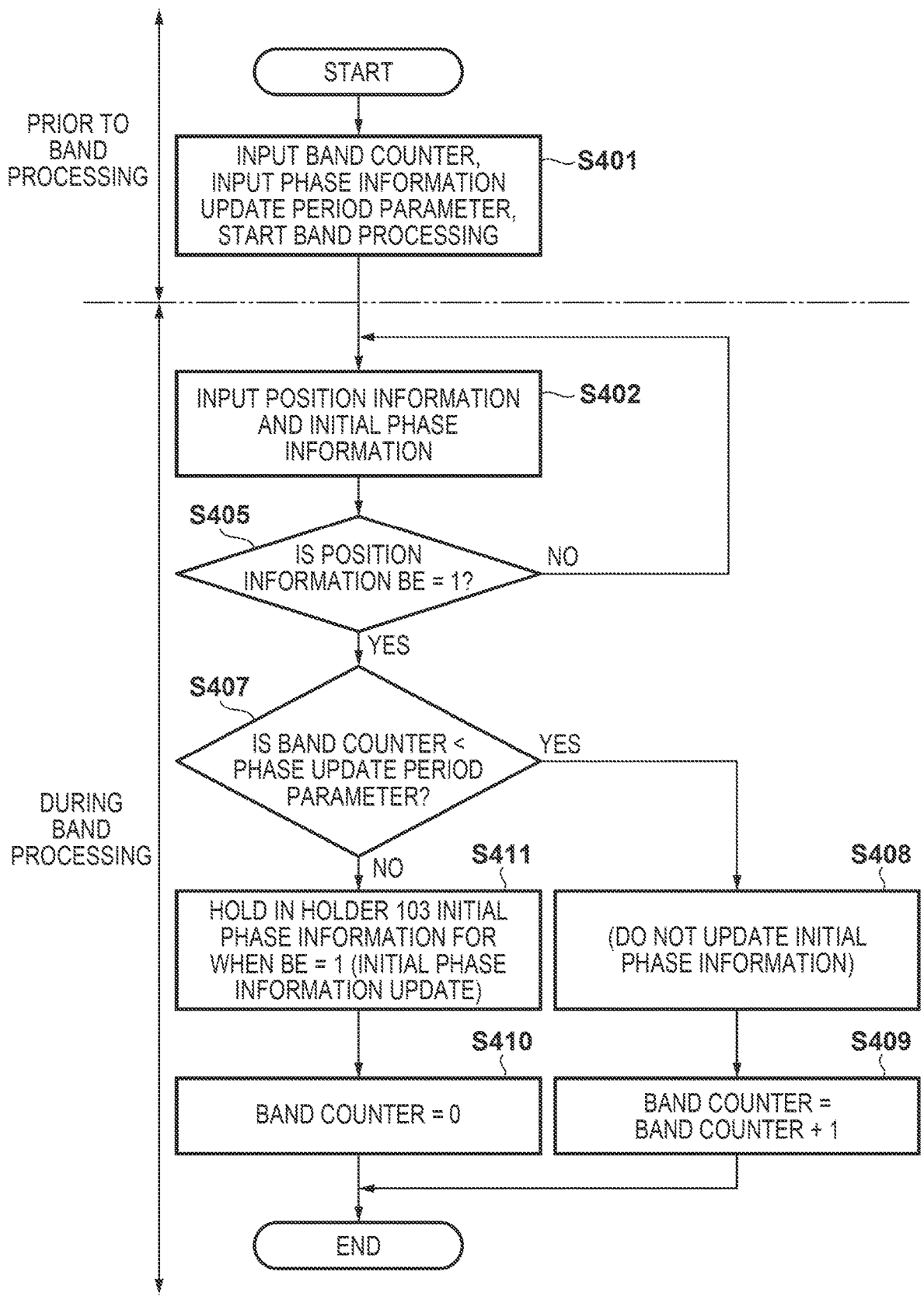
FIG. 4 is a flowchart illustrating operation of an updater.

FIG. 4 is a flowchart illustrating operation of the updater 102.

In step S401, the updater 102, prior to band processing, sets a band counter and a phase information update period parameter (update period information) by firmware control (CPU), and then starts band processing. In other words, the phase information update period parameter is something that is given. The band counter is a parameter for counting the number of times of the band processing (the number of band images that were processed). Note that it is possible to set the value freely, but normally it is set to "0" because it is incremented for each band process. The phase information update period parameter is a parameter for deciding an initial phase information update period in band process units.

In step S402, the updater 102, for each pixel, inputs the position information and initial phase information outputted from the scaling processor 101.

In step S405, the updater 102 determines whether or not the position information indicates a time when band processing ends (BE=1). In a case where BE=1 (in other words, after ending band processing), step S407 is advanced to, and in a case where BE=0, step S402 is returned to.

In step S407, the updater 102 compares the band counter and the phase information update period parameter. In a case where the band counter<the phase information update period parameter, step S408 is advanced to, and in a case where the band counter≥the phase information update period parameter (actually, the same value), step S411 is advanced to.

In step S408, the updater 102 determines that initial phase information of the subsequent band process is the same as the initial phase information of this band process, and does not perform an update of the initial phase information. Then, in step S409, the band counter is incremented.

In step S411, the updater 102 determines that for the initial phase information of the subsequent band process, the position information is initial phase information for when a band process ends (BE=1). Therefore, the initial phase information generated in the scaling processor 101 is outputted, and the initial phase information stored in the holder 103 is updated. Then, in step S410, the band counter is reset (in other words, to "0").

<Band Processing Order>

Next, the order of band processing in various use cases of the image processing apparatus according to the first embodiment will be described.

Figure 5A:
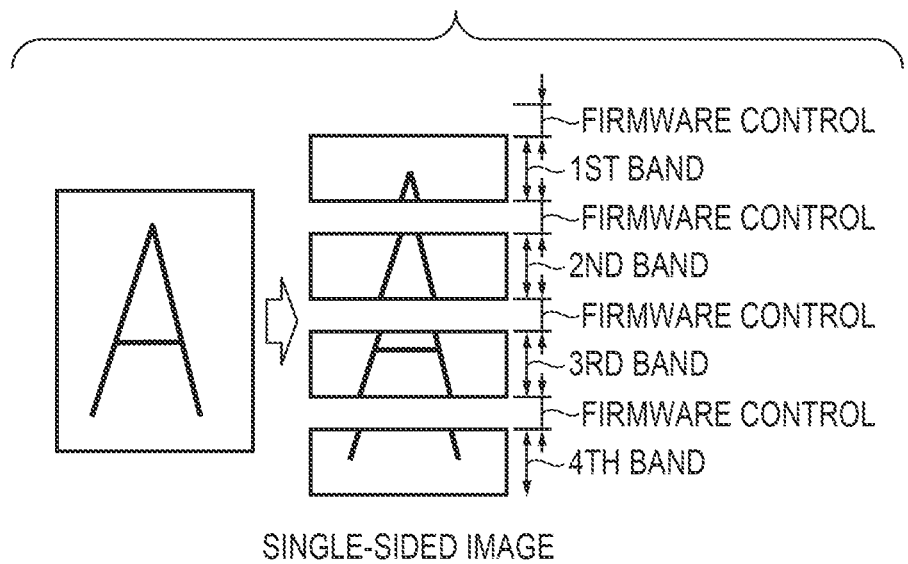
FIG. 5A and FIG. 5B are views for describing an order of processing in single-sided band processing and firmware control positioning.
Figure 5B:
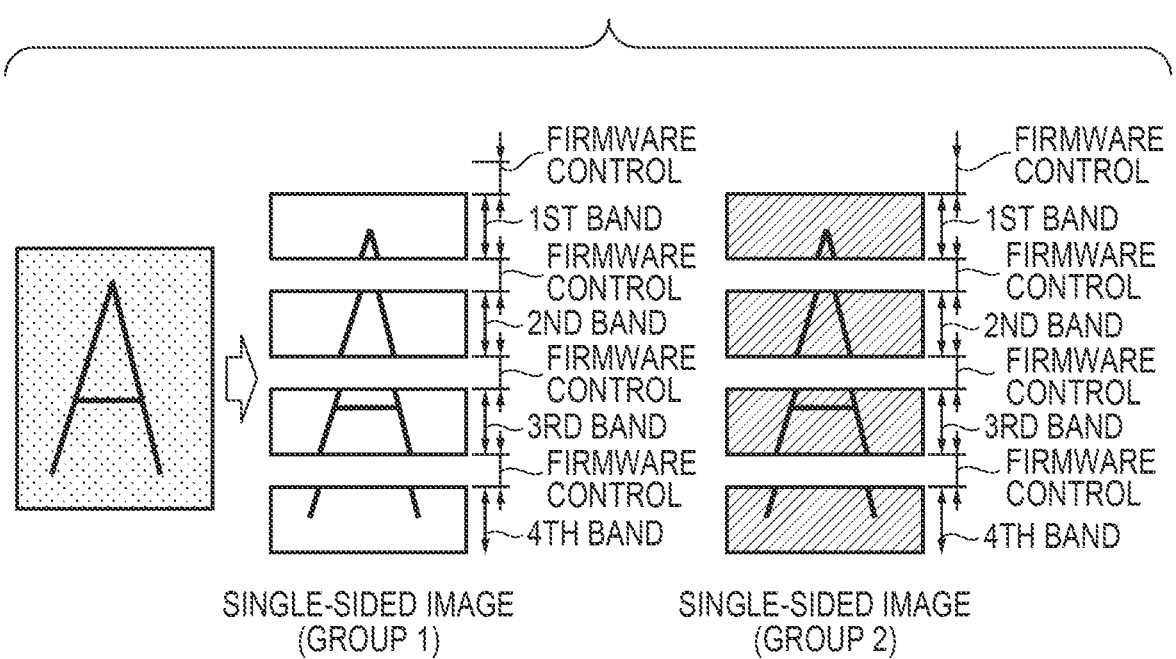

FIG. 5A and FIG. 5B are views for describing an order of band processing in single-sided band process and firmware control positioning. Note that, it is assumed that pixels necessary for the scaling processing are included in each band area. Also, regarding the band process order, for processing acceleration and a reduction in the size of the buffer in which an image is stored, it is envisioned that processing is performed in the order in which images are read from the scanner (1st band, 2nd band, . . . ).

FIG. 5A is a view for describing single-sided monochrome processing. The single-sided monochrome processing is a sequence in which an image that was single-sided printed is read by a scanner and then image processing is performed. In this processing, image processing is performed in accordance with a band order (1st band, 2nd band, . . . ) as is illustrated in FIG. 5A. At that time, the firmware control is performed prior to starting the 1st band and between band processes.

FIG. 5B is a view for describing single-sided multicolor processing. The multicolor processing is a sequence in which the pixel data is divided into groups and band processing is performed in a temporal sequence. For example, pixels of six colors (R, G, B, α, β, γ) are divided into two groups (group 1 and group 2). Then, similarly to in monochrome processing, processing is performed in accordance with band order (1st band, 2nd band, . . . ). At that time, group 1 and group 2 are processed alternatingly for each band. That is, processing in "1st band of group 1"→"1st band of group 2"→"2nd band of group 1"→"2nd band of group 2" . . . order is performed. At this time, because the scaling ratios of group 1 and group 2 are the same, the initial phase information in the same band is the same.

Figure 6B:
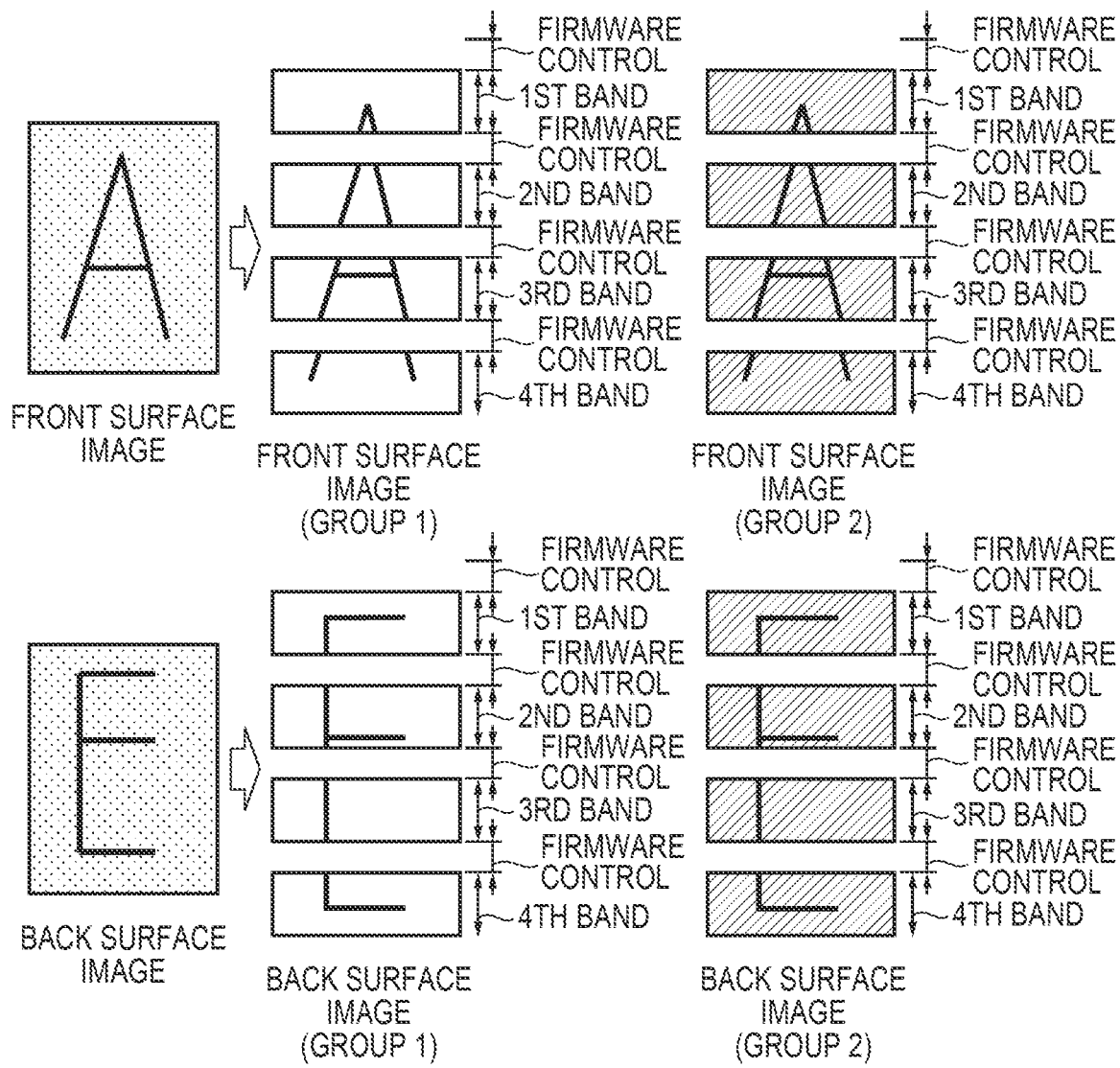

FIG. 6A and FIG. 6B are views for describing an order of band processing in double-sided band processing and a firmware control positioning. FIG. 6A and FIG. 6B are views for describing double-sided monochrome processing and multicolor processing respectively. In double-sided processing is a sequence in which double-sided printed images are read simultaneously by a scanner from a front surface and a back surface, and image processing is performed. Basic operation is the same in single-sided monochrome processing and multicolor processing which are illustrated in FIG. 5A and FIG. 5B.

However, the front surface image and the back surface image are processed alternatingly for each band. That is, processing in "1st band of the front surface image"→"1st band of the back surface image"→"2nd band of the front surface image"→"2nd band of the back surface image" . . . order is performed. At this time, because the scaling ratios of the front surface image and the back surface image are the same, the initial phase information in the same band is the same.

Note that the firmware control can be performed at the top of the page (prior to starting image processing) and between band processes, as illustrated in FIG. 5A, FIG. 5B, FIG. 6A, and FIG. 6B.

<Relationship between Band Counter and Position Information Update Period Parameter>

Next, the relationship between firmware control of the image processing apparatus, the band counter, and the position information update period parameter according to a first embodiment of the present invention will be described.

Figure 7:
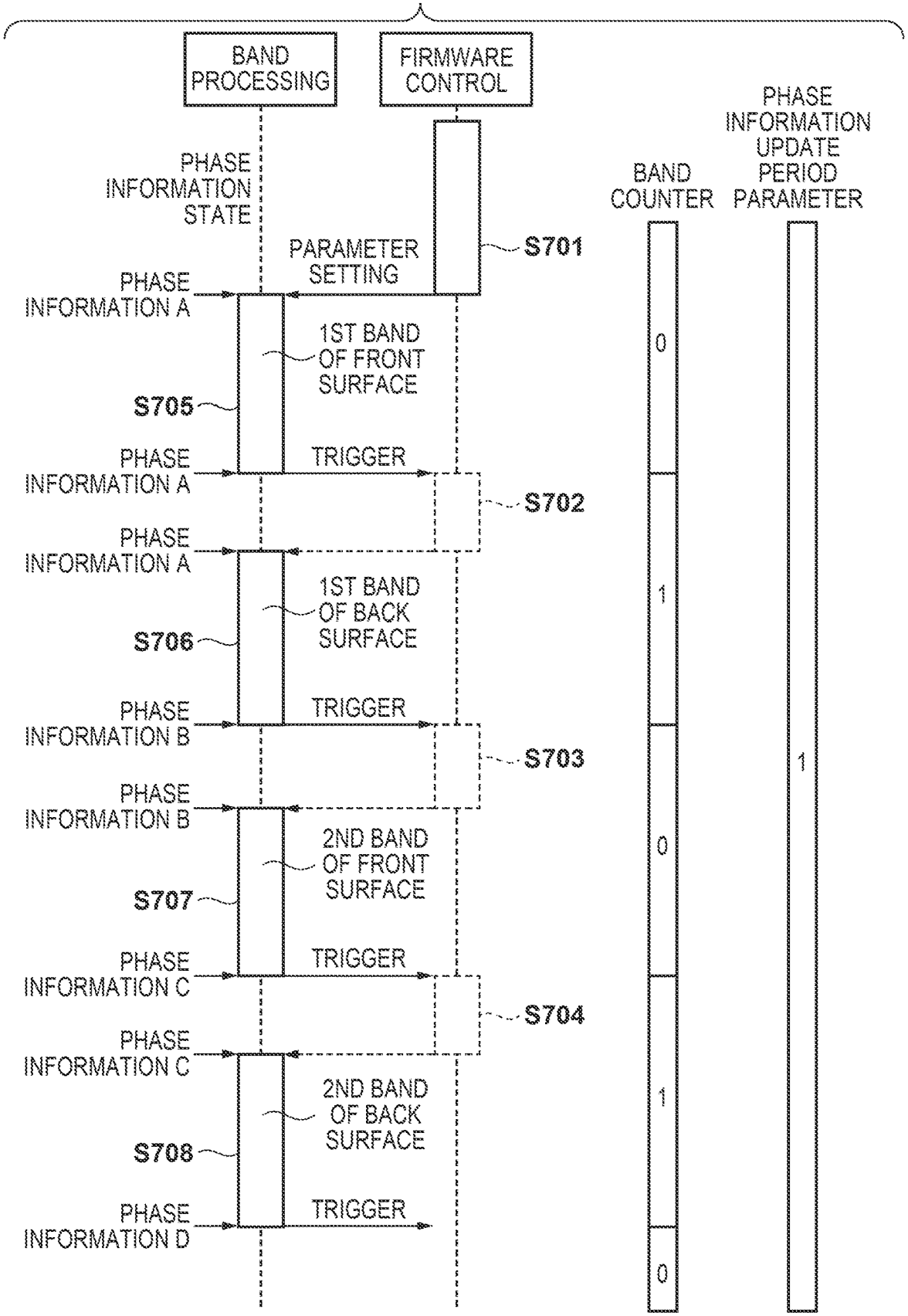
FIG. 7 is a view illustrating a control sequence of the image processing apparatus.

FIG. 7 is a view illustrating a control sequence of the image processing apparatus. Note that there are various use cases as described above, but description is given for the monochrome processing+the double-sided processing illustrated in FIG. 6A.

In step S701, the CPU 1504 performs setting of parameters necessary for image processing prior to starting the image processing. In the case of double-sided processing, the settings band counter=0 and phase information update period parameter=1 are performed. Also, the phase information A (initial phase information) is set for band processing of the 1st band of the front surface. After setting the parameters, image processing (band processing) is started.

In step S705, the image processor 104 executes band processing of the 1st band of the front surface. When the band processing ends, a trigger indicating that the band processing ended is outputted to the CPU. At that time, since the band counter is less than the position information update period parameter, the phase information at the time of the end of the band processing is the phase information A which is the same as the initial phase information when the band processing was started. This phase information A is used as initial phase information for image processing (step S706) on the subsequent 1st band of the back surface. In other words, there is no need to set the phase information A by firmware control (step S702). Note that the band counter is incremented.

In step S706, the image processor 104 executes band processing of the 1st band of the back surface. When the band processing ends, a trigger indicating that the band processing ended is outputted to the CPU. At this time, since the position information update period parameter and the band counter are equal, the phase information stored in the holder 103 becomes phase information B which is calculated by the scaling processor 101. This phase information B is used as initial phase information for image processing (step S707) on the subsequent 2nd band of the front surface. In other words, there is no need to set the phase information B by firmware control (step S703). Note that the band counter is reset to 0.

The foregoing sequence is repeated for image processing of the 2nd band of the front surface (step S707) and image processing (step S708) of the 2nd band of the back surface. Also, there is no need to set phase information by firmware control similarly to step S702 (step S703 and step S704).

Note that in the first embodiment, the band counter and the phase information update period parameter of the image processing apparatus are parameters that can be set from outside. In the foregoing description, it is assumed that the phase information update interval is fixed, but even in the case where the update interval changes at a particular timing, it is possible to handle this by changing the band counter and the phase information update period parameter.

Also, in the foregoing description, the relationship between the firmware control, the band counter, and position information update period parameter is described in regards to the form of monochrome processing+double-sided processing, but if the phase information update interval is fixed, then there is no need to set the parameters between band processes. For example, in the case of multicolor processing+double-sided processing illustrated in FIG. 6B, the phase information is updated once every four times, and therefore it is possible to handle this by setting the phase information update period parameter to "3".

As described above, by virtue of the first embodiment, even in the case of a sequence in which band areas are not continuous, this can be handled by simple firmware control. In particular, in the use case where the initial phase information is not changed between band processes as when performing double-sided processing or multicolor processing, it is possible to provide an image processing apparatus for which the firmware control between band processes is unnecessary.

Second Embodiment

In the second embodiment, description is given of a form in which a phase information update parameter (FIG. 10A and FIG. 10B), in which it is recited whether or not to update phase information corresponding to band processing, is used.

<Apparatus Configuration>

Figure 8:
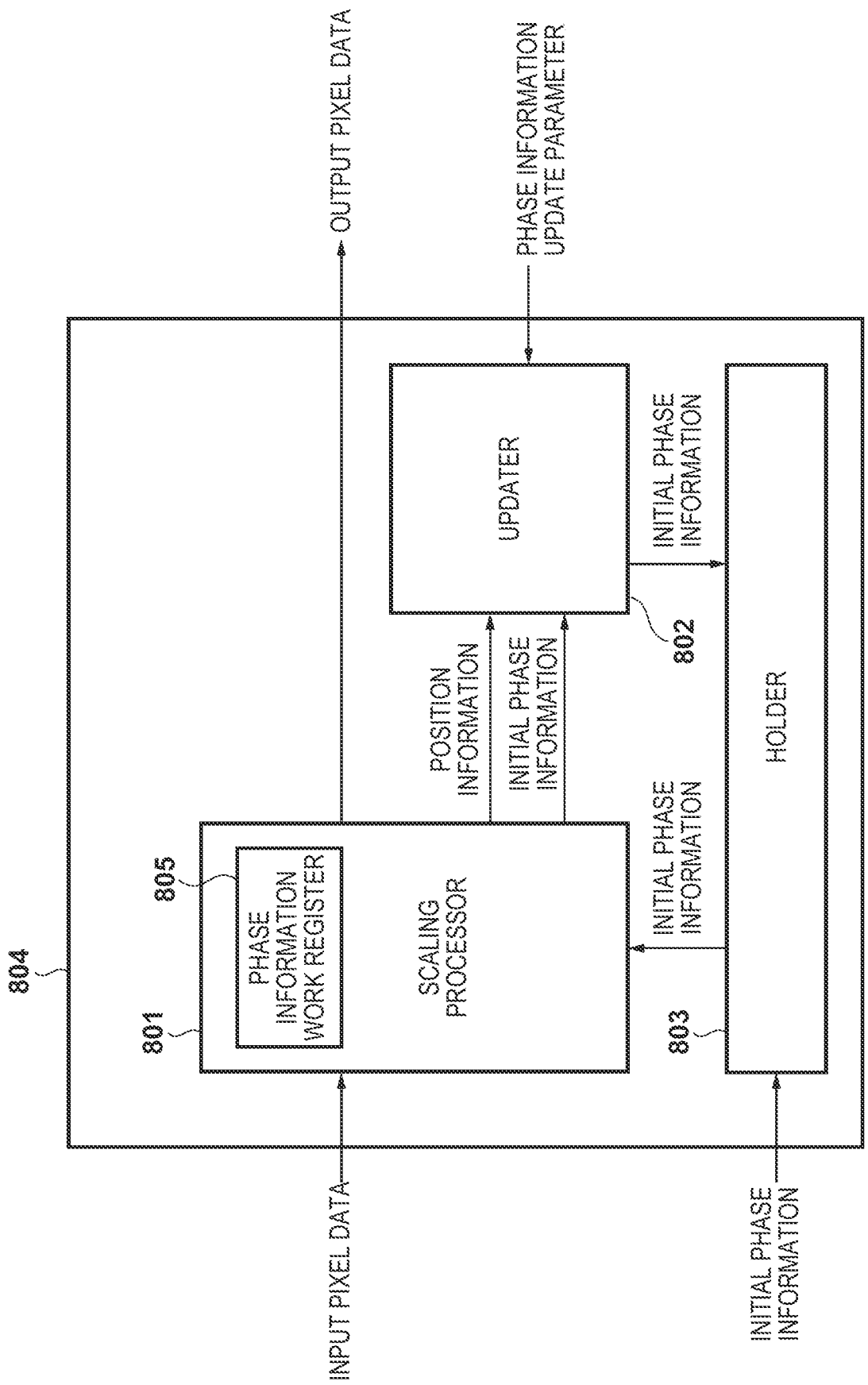
FIG. 8 is a detailed block diagram of an image processor (Second Embodiment).

FIG. 8 is a detailed block diagram of an image processor 804 in the second embodiment. There is a difference from the first embodiment (FIG. 1) in that an updater 802 is comprised in place of the updater 102. Other configurations are similar to in FIG. 1, and so description thereof is omitted.

The updater 802 inputs position information and initial phase information generated by a scaling processor 801. Also, in accordance with a later-described phase information update parameter, the initial phase information is updated. Detailed operation of the updater 802 will be described later.

<Apparatus Operation>

Figure 9:
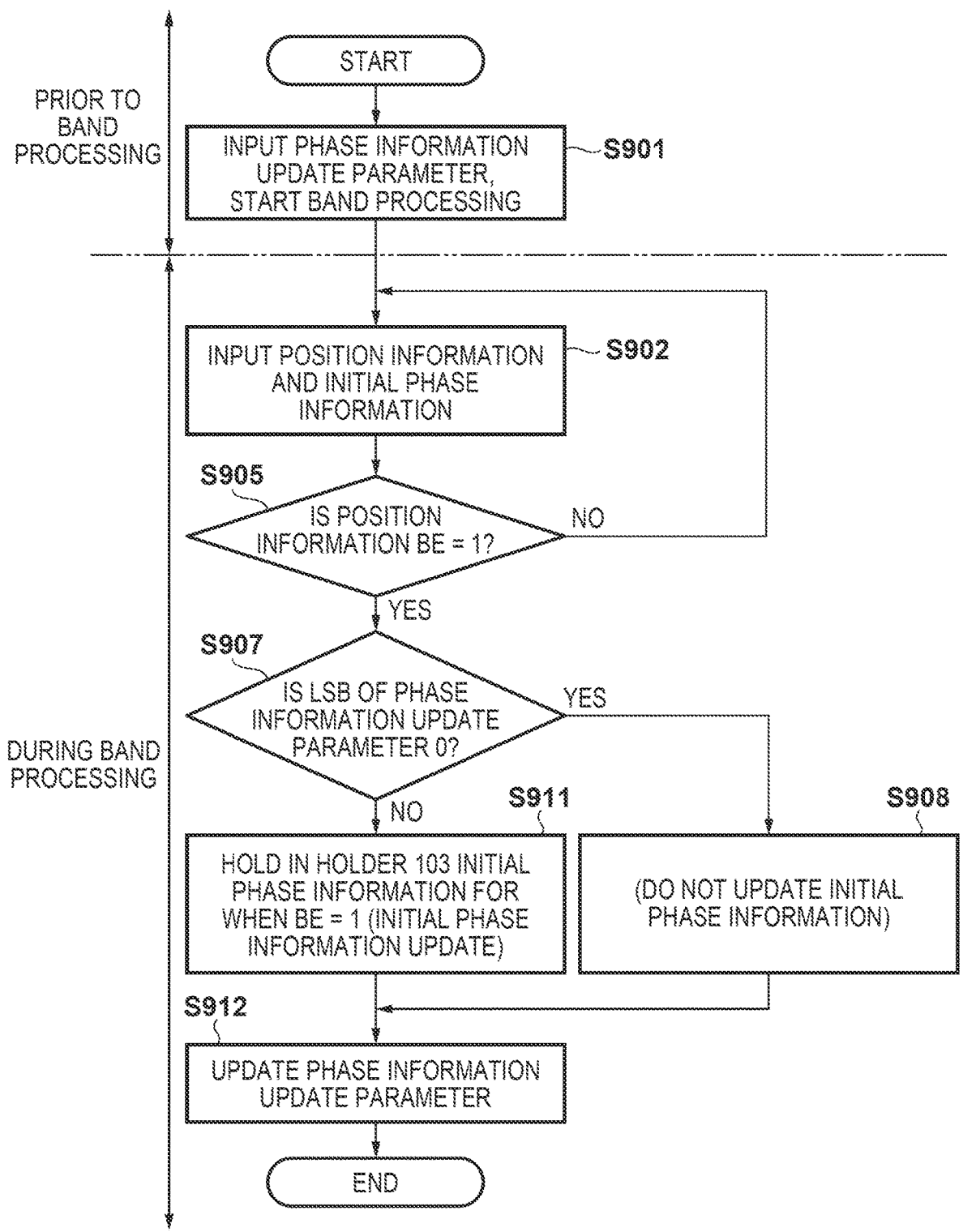
FIG. 9 is a flowchart illustrating operation of an updater (Second Embodiment).

FIG. 9 is a flowchart illustrating operation of the updater 802 in the second embodiment. Note that description is omitted regarding operation that is similar to in the first embodiment (FIG. 4).

In step S901, the updater 802, prior to band processing, sets the phase information update parameter by firmware control (CPU), and then starts band processing. Regarding the phase information update parameter, it is recited whether or not to update the phase information corresponding to band processing.

Figure 10A:
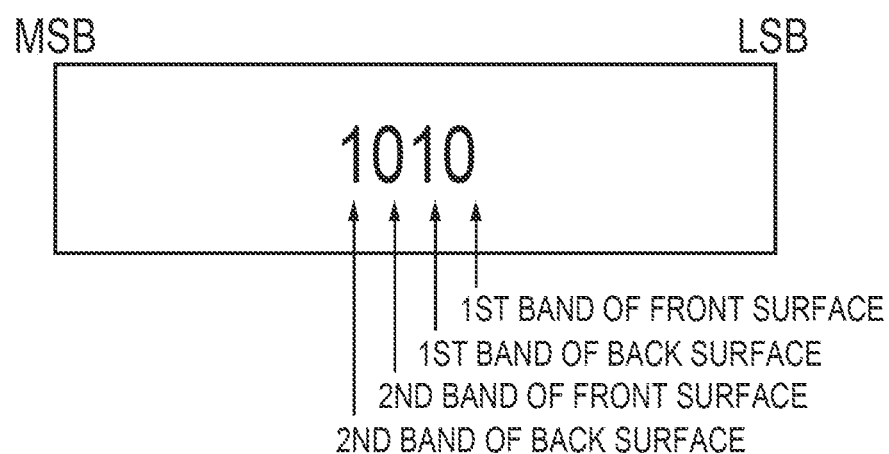
FIG. 10A and FIG. 10B are views for describing phase information update parameters in double-sided processing.
Figure 10B:
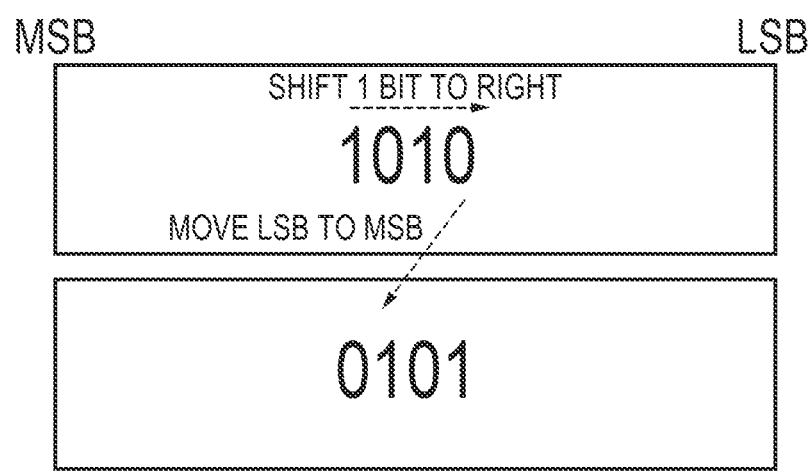

FIG. 10A and FIG. 10B are views for describing phase information update parameters in double-sided processing. FIG. 10A is an example of the phase information update parameter in double-sided processing. Each bit represents whether or not to update phase information at the time of each band process. Here, the band process order is represented in order from LSB. For example, "0" is represented in band processing for the 1st band of the front surface, "1" is represented in band processing for the 1st band of the back surface, "0" is represented in band processing for the 2nd band of the front surface, and "1" is represented in band processing for the 2nd band of the back surface. Note that from the 3rd band, the LSB is returned to, and band processing is represented thereby.

The updater 802 references (step S907) the LSB of the phase information update parameter in the case where, in step S905, the position information inputted in step S902 is BE=1, which indicates that band processing ends. When the LSB of the phase information update parameter is "0", the initial phase information of the subsequent band process is determined to be the same as the initial phase information of that band process. Accordingly, the initial phase information is not updated (step S908). Meanwhile, when the LSB of the phase information update parameter is "1", the initial phase information of the subsequent band process is determined to be the initial phase information for when the position information is band processing ends (BE=1). Therefore, the initial phase information generated by the scaling processor 101 is outputted, and the initial phase information stored in the holder 103 is updated (step S911). Then, the phase information update parameter is updated (step S912). Specifically, as illustrated in FIG. 10B, the phase information update parameter is shifted 1 bit to the right. At that time, the LSB is moved to the MSB.

As described above, by virtue of the second embodiment, it becomes possible to have a simpler configuration by using a phase information update parameter in which it is recited whether or not to update the phase information corresponding to the band processing.

Third Embodiment

In the third embodiment, description is given of a form in which tile processing, in which processing is performed in relation to tiles areas (tile images) into which band areas (band image) are further divided, is performed. The tile areas in the tile processing further divide the band areas in a horizontal direction (a direction orthogonal to the direction of the band division). In other words, in the third embodiment, the unit of processing differs to that of the first and second embodiments.

Figure 11:
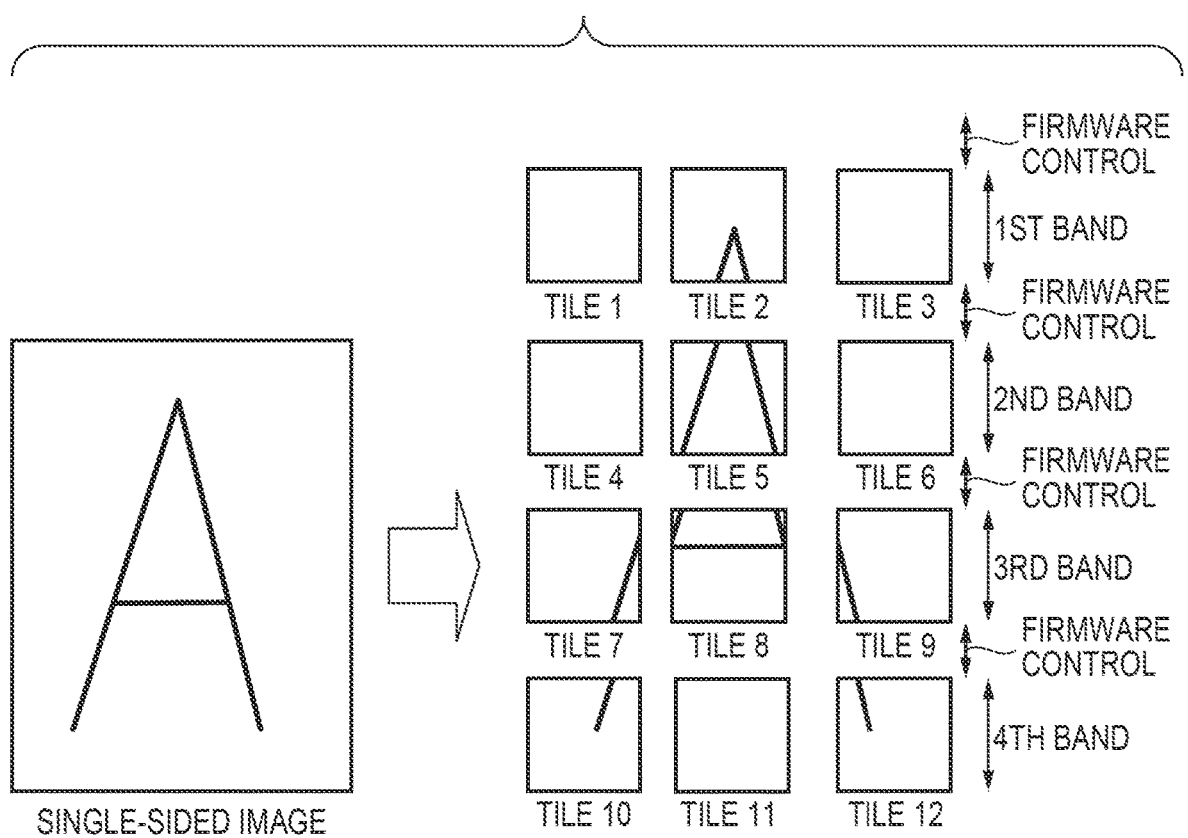
FIG. 11 is a view for describing an order of processing in tile processing and firmware control positioning.

FIG. 11 is a view for describing an example in which one image is divided into 12 tile units (3×4), and image processing is performed on each tile. The order of image processing is the order in which images are read by the scanner (1st band, 2nd band, . . . ), similarly to the foregoing band processing. Also, the order in a single band is tile 1, tile 2, tile 3, . . . , for example.

<Apparatus Configuration>

Figure 13:
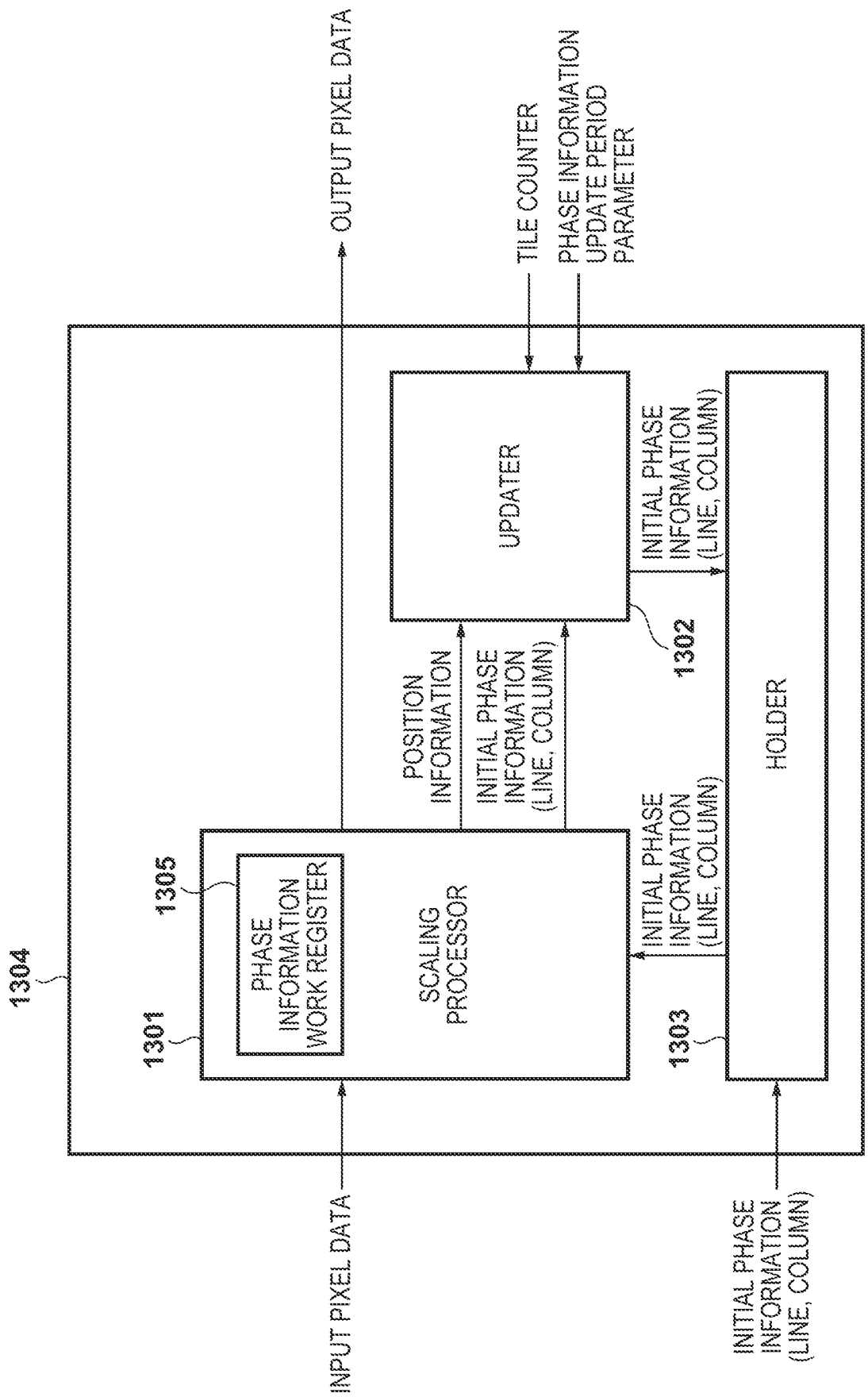
FIG. 13 is a detailed block diagram of an image processor (Third Embodiment).

FIG. 13 is a detailed block diagram of an image processor 1304 in the third embodiment. Since the operation of a scaling processor 1301 and a holder 1303 is similar to that of the scaling processor 101 and the holder 103 respectively, description is omitted.

In tile processing, unlike in the band processing, there is updating of line (horizontal) direction initial phase information (line) in the direction of a line (same band). For this reason, in the scaling processor 1301 and the holder 1303, in addition to initial phase information (hereinafter referred to as initial phase information (column)) that is similar to that of the scaling processor 101 and the holder 103, line-direction initial phase information (hereinafter called initial phase information (line)) is outputted. Also, the holder 1303 holds initial phase information (column) and initial phase information (line).

Regarding an updater 1302, generation of initial phase information (column) is the same as in the flowchart illustrated in FIG. 4, and therefore description is omitted. Meanwhile, description is given regarding generation of initial phase information (line) using the flowchart of FIG. 12. Note that the initial phase information indicated below is described as initial phase information (line).

<Apparatus Operation>

Figure 12:
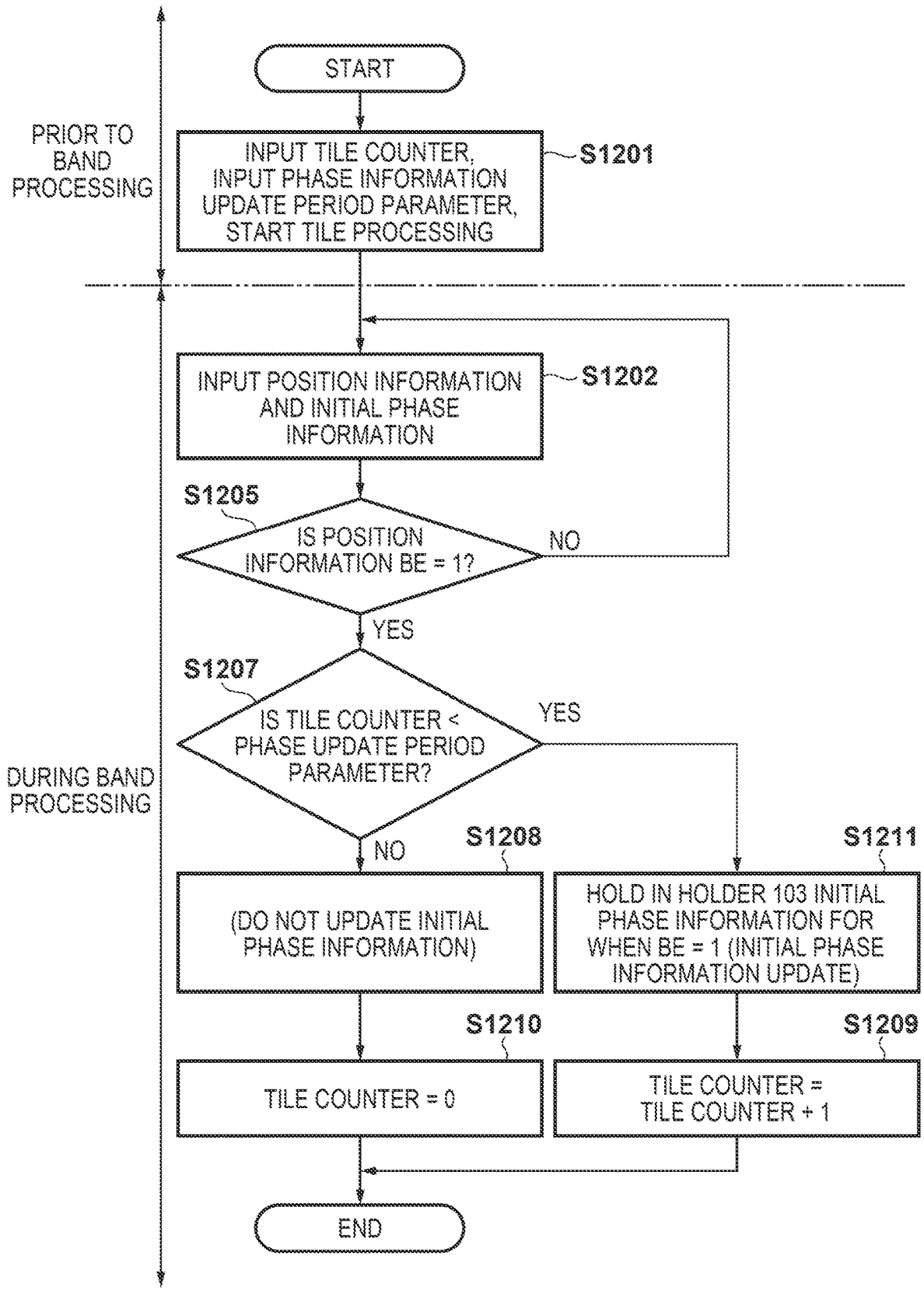
FIG. 12 is a flowchart illustrating operation of an updater (Third Embodiment).

FIG. 12 is a flowchart illustrating operation of the updater 1302 in the third embodiment. Note that description is omitted regarding operation that is similar to in the first embodiment (FIG. 4).

In step S1201, the updater 1302, prior to tile processing, sets a tile counter and a phase information update period parameter by firmware control (CPU), and then starts tile processing. The tile counter is a parameter for counting the number of times tile processing is performed. Note that it is possible to set the value freely, but normally it is set to "0" because it is incremented for each tile process. The phase information update period parameter is a parameter for deciding an initial phase information update period in tile process units. However, in the initial phase information (column) this is something for deciding the period at which to update the initial phase information, and in the initial phase information (line) this is something for deciding the period over which the initial phase information is not updated.

In step S1207, the updater 1302 compares the tile counter and the phase information update period parameter. In a case where the tile counter<the phase information update period parameter, step S1211 is advanced to, and in a case where the tile counter≥the phase information update period parameter (in practice, when it is the same value), step S1208 is advanced to.

In step S1211, the updater 1302 determines that the subsequent tile process initial phase information is initial phase information for when the position information is tile processing ends (BE=1). Therefore, the initial phase information generated in the scaling processor 101 is outputted, and the initial phase information stored in the holder 103 is updated. Then, in step S1209, the tile counter is incremented.

In step S1208, the updater 1302 determines that the subsequent tile process initial phase information is the same as this tile process initial phase information, and does not perform an update of the initial phase information. Then, in step S1210, the band counter is reset (in other words, to "0").

By the foregoing control, a sequence in which the initial phase information (line) is updated in tile 1 and tile 2 as illustrated in FIG. 11, for example, and is not updated in tile 3 is carried out.

As described above, by virtue of the third embodiment, tile processing can be handled by simple firmware control. In other words, the sequence for generating the initial phase information (column) and the initial phase information (line) is different, but firmware control between tile processes for the tile counter and the phase information update period parameter illustrated in FIG. 13 is unnecessary.

Fourth Embodiment

In the fourth embodiment, a form in which video processing is performed is described. Specifically, while scaling processing was described in the above described embodiment, the present invention can be applied in use cases in which attribute information that is generated by particular processing is updated using a fixed interval. For example, the present invention can be applied to a use case in which, in video processing for generating attribute information based on histogram data, the foregoing attribute information is updated between frames that configure the video at a fixed period.

Figure 14:
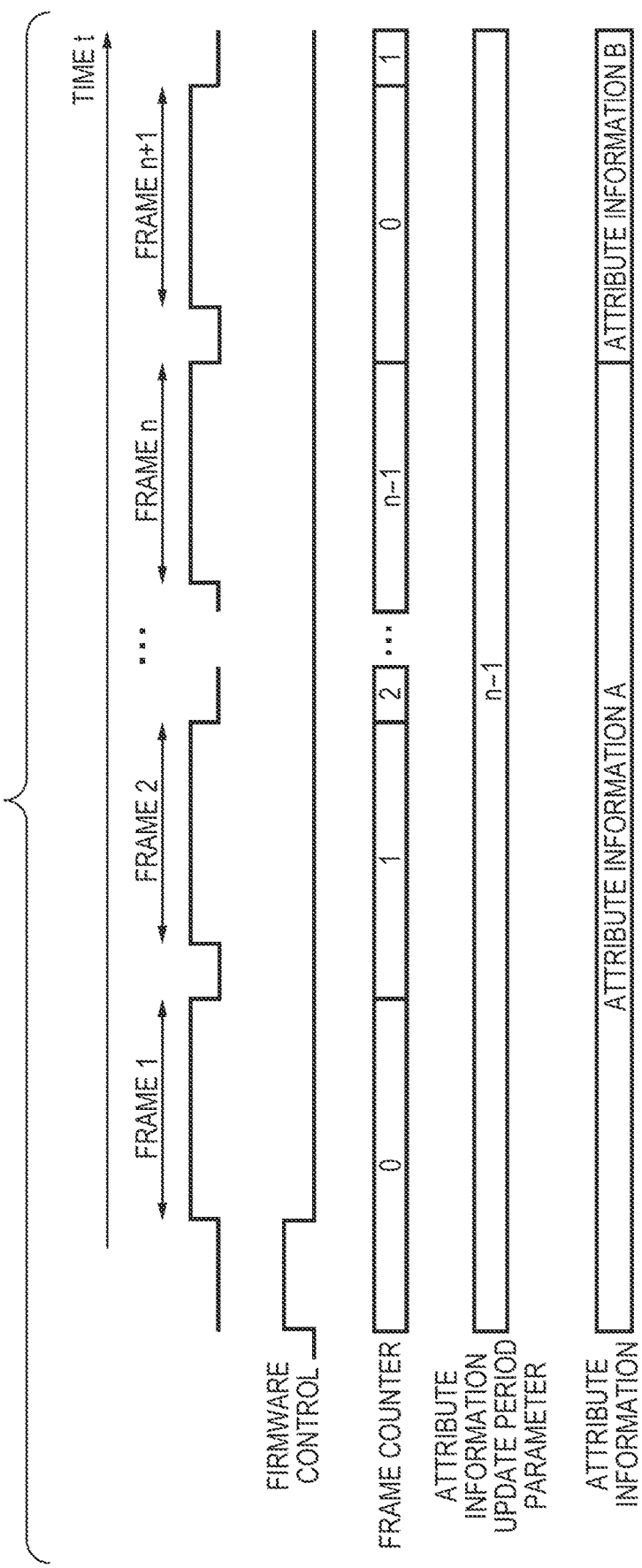
FIG. 14 is a view illustrating an example of an operation of an updater (Fourth Embodiment).

FIG. 14 is a view illustrating an example of operation of an updater 1703. Note that hereinafter, each frame unit process will be called a frame process.

<Apparatus Configuration>

FIG. 17 is a detailed block diagram of an image processor 1704 in the fourth embodiment.

A video processor 1701 inputs pixel data in a frame (for example, R, G, and B or the like). Then, it performs histogram processing by a publicly known method, for example, and stores the result in a memory 1706. Then, when the histogram processing of all of the pixel data in the frame ends, attribute information is generated by using the histogram stored in the memory 1706 and attribute information stored in the holder 1703 as described later. It is possible to determine that all of the pixel data was inputted by the position information.

Regarding the updater 1703, since it is similar to the updater 102 and the operation of the sequence for generating initial phase information at the time of band processing illustrated in FIG. 4, detailed description is omitted. Specifically, the initial phase information illustrated in FIG. 4 is replaced with attribute information, the phase information update period parameter is replaced with an attribute information update period parameter, and the band counter is replaced with a frame counter.

However, the frame counter illustrated in FIG. 17, unlike the band counter illustrated in FIG. 1, is a parameter for deciding the period for updating the initial phase information in frame process units. In other words, it is possible to update attribute information every few frames. For example, in the example of the sequence illustrated in FIG. 14, the attribute information update period parameter is set to n−1. Accordingly, the outputted attribute information is updated every n frames, and the frame counter is reset to "0".

The updater 1703, similarly to the holder 103, holds attribute information outputted from an updater 1702. Also, it is possible to set attribute information by a CPU or the like. Then, the attribute information that is held is read by the CPU or the like, and is used as analysis information for a fog removal process, for example. Ambient light estimation processing is performed based on plural attribute information (histogram results for R, G, B, and Y) that is read every few frames, and an ambient light value is generated. Then, using the ambient light value, a fog transmittance map is generated, and fog removal processing is performed.

As described above, by virtue of the fourth embodiment, video processing can be handled by simple firmware control. In other words, firmware control is unnecessary in a use case in which generated attribute information is updated at a fixed interval in frame units. That is, even when the image processing unit is the frame process, it is possible to provide an image processing apparatus for which firmware control between frame processes is unnecessary.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-051710, filed Mar. 16, 2017, which is hereby incorporated by reference herein in its entirety.

What is claimed is:

1. An image processing apparatus operable to divide an input image into a plurality of rectangular images, and to perform image processing for each rectangular image, the apparatus comprising:
    one or more processors connected to one or more memories, the one or more processors being configured to operate as:
    a storage unit configured to store intermediate information corresponding to each pixel in a rectangular image;
    an image processing unit configured to perform image processing on pixel data of a rectangular image of interest based on the intermediate information stored in the storage unit, and to generate intermediate information to be used in image processing on pixel data subsequent to the rectangular image of interest;
    an updating unit configured to update the intermediate information stored in the storage unit with the intermediate information generated by the image processing unit; and
    a counter configured to count the number of rectangular images processed by the image processing unit, wherein
  the updating unit, after the end of the image processing on the rectangular image of interest, compares a value indicating the counter and given update period information that indicates an intermediate information update period, and updates the intermediate information based on the result of the comparison.

2. The image processing apparatus according to claim 1, the one or more processors being configured to operate as a control unit configured to, prior to image processing on a first rectangular image among the plurality of rectangular images, store in the storage unit initial intermediate information corresponding to the first rectangular image.

3. The image processing apparatus according to claim 1, wherein
  the image processing by the image processing unit is image scaling processing that is based on the intermediate information.

4. The image processing apparatus according to claim 3, wherein
  the intermediate information is phase information that indicates a distance between an input pixel position and an output pixel position in the scaling processing.

5. The image processing apparatus according to claim 1, wherein
  the rectangular images are band images into which the input image is divided in a first direction or are tile images into which the band images are further divided in a second direction that is orthogonal to the first direction.

6. The image processing apparatus according to claim 1, wherein
  the value indicating the counter and the update period information are represented by integers.

7. The image processing apparatus according to claim 6, wherein
  the updating unit updates the intermediate information in a case where the value indicating the counter is the value indicating the update period information or greater.

8. The image processing apparatus according to claim 6, wherein
  in a case where the intermediate information is updated, the updating unit sets the value indicating the counter to 0.

9. The image processing apparatus according to claim 6, wherein
  in a case where the image processing is multicolor processing, the update period information is a value that is larger than in a case where the image processing is monochrome processing.

10. The image processing apparatus according to claim 6, wherein
  in a case where the image processing is double-sided processing, the update period information is a value that is larger than in a case where the image processing is single-sided processing.

11. The image processing apparatus according to claim 1, wherein
  the update period information is set by firmware control.

12. The image processing apparatus according to claim 1, wherein
  the rectangular image is a frame that configures a video.

13. The image processing apparatus according to claim 12,
  wherein the intermediate information is attribute information based on a histogram of pixel data of the frame.

14. A method of controlling an image processing apparatus operable to divide an input image into a plurality of rectangular images and to perform image processing for each rectangular image, the image processing apparatus comprising a storage unit configured to store intermediate information in relation to each pixel in a rectangular image, the method comprising:
  an image processing step of performing image processing on pixel data of a rectangular image of interest based on the intermediate information stored in the storage unit, and generating intermediate information to be used in image processing on pixel data subsequent to the rectangular image of interest;
  an updating step of, based on given update period information that indicates an intermediate information update period, updating, with the intermediate information generated by the image processing step, the intermediate information stored in the storage unit;
  a counting step of counting the number of rectangular images processed by the image processing step,
  wherein
  the updating step, after the end of the image processing on the rectangular image of interest, compares a value indicating the counter and the update period information, and updates the intermediate information based on the result of the comparison.

15. A non-transitory computer-readable recording medium storing a program that causes a computer to function as an image processing apparatus operable to divide an input image into a plurality of rectangular images, and to perform image processing for each rectangular image, the apparatus comprising:
  a storage unit configured to store intermediate information corresponding to each pixel in a rectangular image;
  an image processing unit configured to perform image processing on pixel data of a rectangular image of interest based on the intermediate information stored in the storage unit, and to generate intermediate information to be used in image processing on pixel data subsequent to the rectangular image of interest;
  an updating unit configured to update the intermediate information stored in the storage unit with the intermediate information generated by the image processing unit; and
  a counter configured to count the number of rectangular images processed by the image processing unit,
  wherein
  the updating unit, after the end of the image processing on the rectangular image of interest, compares a value indicating the counter and given update period information that indicates an intermediate information update period, and updates the intermediate information based on the result of the comparison.

* * * * *